United States Patent
Tee et al.

(10) Patent No.: US 8,412,685 B2
(45) Date of Patent: Apr. 2, 2013

(54) METHOD AND SYSTEM FOR MANAGING DATA

(75) Inventors: Philip Tee, Claygate (GB); Stephen John Dodson, London (GB); Robert Duncan Harper, London (GB)

(73) Assignee: Riverbed Technology, Inc., San Francisco, CA (US)

( * ) Notice: Subject to any disclaimer, the term of this patent is extended or adjusted under 35 U.S.C. 154(b) by 459 days.

(21) Appl. No.: 11/145,201

(22) Filed: Jun. 3, 2005

(65) Prior Publication Data

US 2006/0020646 A1    Jan. 26, 2006

Related U.S. Application Data

(60) Provisional application No. 60/591,116, filed on Jul. 26, 2004.

(51) Int. Cl.
*G06F 17/00* (2006.01)
(52) U.S. Cl. .................................................. 707/692
(58) Field of Classification Search .......... 707/10, 707/8, 4, 204, 102, 692, 694, 999.101
See application file for complete search history.

(56) References Cited

U.S. PATENT DOCUMENTS

| | | | |
|---|---|---|---|
| 4,914,590 A * | 4/1990 | Loatman et al. .................. 704/8 |
| 5,897,661 A | 4/1999 | Baranovsky et al. |
| 5,930,801 A * | 7/1999 | Falkenhainer et al. ... 707/103 R |
| 6,240,416 B1 | 5/2001 | Immon et al. |
| 6,615,405 B1 | 9/2003 | Goldman et al. |
| 6,643,652 B2 * | 11/2003 | Helgeson et al. ............... 707/10 |
| 6,654,747 B1 | 11/2003 | Van Huben et al. |
| 6,662,357 B1 | 12/2003 | Bowman-Amuah |
| 6,694,336 B1 * | 2/2004 | Multer et al. .................. 707/201 |
| 6,694,357 B1 | 2/2004 | Volnak |
| 6,697,846 B1 | 2/2004 | Soltis |
| 6,704,839 B2 | 3/2004 | Butterworth et al. |
| 6,912,543 B2 * | 6/2005 | Agulhon .................. 707/103 X |
| 7,043,503 B2 * | 5/2006 | Haskin et al. ................. 707/200 |
| 7,047,321 B1 * | 5/2006 | Endo ................................. 710/6 |
| 7,089,323 B2 * | 8/2006 | Theimer et al. ............... 709/238 |
| 7,096,228 B2 * | 8/2006 | Theimer et al. ............... 707/101 |
| 7,117,201 B2 * | 10/2006 | Kuno et al. ....................... 707/3 |
| 7,124,133 B2 * | 10/2006 | Yamauchi et al. ............. 707/10 |
| 7,127,545 B1 * | 10/2006 | Nandi et al. .................. 710/316 |
| 7,136,903 B1 * | 11/2006 | Phillips et al. ................ 709/217 |
| 7,167,880 B2 * | 1/2007 | Amano et al. ................ 707/205 |
| 7,174,360 B2 * | 2/2007 | Uemura et al. ............... 709/201 |
| 7,203,731 B1 * | 4/2007 | Coates et al. ................. 709/214 |
| 7,206,863 B1 * | 4/2007 | Oliveira et al. ............... 709/245 |
| 7,209,967 B2 * | 4/2007 | Kitamura ..................... 709/225 |
| 7,216,253 B2 * | 5/2007 | Miller et al. .................... 714/15 |
| 7,219,096 B2 * | 5/2007 | Haugh ............................. 707/8 |
| 7,222,148 B2 * | 5/2007 | Potter et al. .................. 709/201 |

(Continued)

OTHER PUBLICATIONS

International Search Report PCT/IB2005/003242, Feb. 22, 2006.

(Continued)

*Primary Examiner* — Mohammed R Uddin
(74) *Attorney, Agent, or Firm* — Park, Vaughan, Fleming & Dowler LLP

(57) ABSTRACT

A system and method for managing data is provided. The system includes a network for interconnecting a plurality of computers. A data storage means is connected to the network to receive, store and transmit a plurality of files to and from the network. A plurality of computers is also connected to the network. Each computer is configured for originating and for receiving files. Each of the files has a unique identifier associated therewith. Each computer may retrieve a file from the data storage means using the unique identifier.

17 Claims, 10 Drawing Sheets

U.S. PATENT DOCUMENTS

| | | | |
|---|---|---|---|
| 7,257,368 B2 * | 8/2007 | Yahagi | 455/8 |
| 7,266,555 B1 * | 9/2007 | Coates et al. | 707/10 |
| 7,266,556 B1 * | 9/2007 | Coates | 707/10 |
| 2002/0073080 A1 * | 6/2002 | Lipkin | 707/3 |
| 2002/0133491 A1 * | 9/2002 | Sim et al. | 707/10 |
| 2002/0156840 A1 * | 10/2002 | Ulrich et al. | 709/203 |
| 2002/0156975 A1 * | 10/2002 | Staub et al. | 711/114 |
| 2002/0161846 A1 * | 10/2002 | Ulrich et al. | 709/213 |
| 2002/0161850 A1 * | 10/2002 | Ulrich et al. | 709/214 |
| 2004/0039756 A1 | 2/2004 | Bromley | |
| 2004/0039757 A1 * | 2/2004 | McClure | 707/201 |
| 2004/0122927 A1 * | 6/2004 | Muehl et al. | 709/223 |
| 2004/0133607 A1 | 7/2004 | Miloushev et al. | |
| 2004/0187111 A1 * | 9/2004 | Eakin | 718/100 |
| 2004/0230676 A1 * | 11/2004 | Spivack et al. | 709/223 |
| 2007/0101074 A1 * | 5/2007 | Patterson | 711/156 |

OTHER PUBLICATIONS

PCT Notice of Transmittal of and Including The International Preliminary Report on Patentability, Nov. 30, 2006.

* cited by examiner

METHOD AND SYSTEM FOR MANAGING DATA

CROSS REFERENCE TO RELATED APPLICATIONS

This application claims the benefit of U.S. Provisional Patent Application No. 60/591,116 filed Jul. 26, 2004.

BACKGROUND OF THE INVENTION

1. The Field of the Invention

The present invention generally relates to storing electronic data and more specifically, the invention relates to a system and method for managing data that is electronically stored.

2. State of the Art

The widespread use of electronic data systems to create, transmit, store and retrieve data is self evident. Computers and computer systems are ubiquitous with businesses and other groups now being connected by various systems or networks. Users in such systems access and transmit messages (e.g., e mail) and a wide variety of other data as part of their daily business activities.

At the same time, there is growing reliance on electronic data storage over paper records. Data storage is exploding at an incredible rate as more and more users accept or prefer electronic storage over paper storage. Protocols for e mail and other documents may lead to storage of a ghost document, a backup document and later the final document. The sender and all recipients will store and retain in a variety of ways and in turn are often storing the same document or data. At the same time, highly sensitive business information which is electronically transmitted is more difficult to regulate and control.

Electronic storage can simply be the memory of a computer, but can also be servers attached to a network that users can access and use to storage documents of all kinds. In the past, tapes, discs and even punch cards have functioned as an electronic data storage device and also as a form of back up. Today, many use tapes, discs or CD's to backup their computer systems. With the explosion of electronic data, not only are the memory capabilities of the computer or system of the user being taxed, the back-up systems are starting to become cumbersome because the data to be recorded in the back-up process is becoming excessive.

The size and in deed the number of networks continue to increase. Some users will be tied to several networks. They could, for example, be able to access the world wide web, be connected to a LAN for its geographic area (e.g., office/floor), and to a system network that could be company wide involving electronic interconnection of offices in multiple cities.

Storage of data has led to the development of large database servers which can now contain or store 100 gigabytes (GB) to at least 1 terabyte (TB) of records and files. The large quantity of data in different systems makes backup difficult during periods of reduced or non user (e.g., overnight).

Recently, Storage Area Networks (SAN) have been developed to replace locally attached disk and tape drives and resulted in hundreds of systems being able to share the same disk or tape drive. A SAN is a high-speed special purpose network (or sub-network) that interconnects the different kinds of data storage devices with associated data servers on behalf of a larger network of users. A SAN may use a variety of proprietary protocols optimized accelerating data transfer to a storage medium.

A Network Attached Storage (NAS) may also be used for data storage. A NAS is a system dedicated to sharing files via Network File System (NFS) and Common Internet File System (CIFS). The CIFS protocol shares files between Windows® based desktops and laptops. However, any Unix box configured processor can read from or write to any file system on any other Unix box via NFS—provided it has been configured to effect file sharing. Each system requires dedicated servers incurring extra cost and extra administration. Given suitable software, the protocol to access the file system is believed to be independent of the platform.

NAS appears to have evolved to offer network shared file systems resulting in an overall improvement in performance. NAS is a network appliance containing storage that is accessed by either NFS or CIFS. In the commercial environment SAN, NAS and alternatives such as Solid State Storage are prevalent.

Data is traditionally stored on these systems in units called files. A file may be quite small containing a few kilobytes (kb) to megabytes (mb) of data. Files have been adopted as a mechanism for organizing electronic data leading to directories on the various types of available storage media for locating and retrieving the files. Boolean logic has been adopted in data management systems so that \directories may contain other directories, called subdirectories, and subdirectories may contain other subdirectories, leading to an inverted hierarchical storage system. Assigning directories names has lead to the evolution of a sequence of directories within directories identified by a directory path or the path name. A file is created, accessed and stored by supplying a path name.

For example, in a computer system with multiple Personal computers (PC's) connected by a network, a local disk and an attached storage (NAS) device, Client A uses a PC to communicate a message (data) to Client B's PC through or over whatever network is in place. The data is stored as the message is broadcast (and sometimes as it is generated) on the NAS, depending on the client application, through a reference to the path name assigned by the sender. The file server then performs an operation on the file system called "mounting." A mount attaches a named file system to the file system hierarchy at the pathname location directory.

By referencing a file that starts with /disk1, the file server can direct the data to the local disk. If a file that starts with /disk2 is referenced, the file server can direct the data to the NAS. Therefore, the file, via the path name, determines where it is physically stored, thus relegating the filing mechanism to the structure of the path name for the lifetime of the file.

When Client A creates the data, the system typically functions to store that data so that the path name is accessible to Client A. Client A can then recover the data. When Client B receives the data or message, the data may again be stored. Client B may store the message or data under a newly assigned path name so that in effect identical data is now being stored in the server but with different path names.

Many companies now store data from a variety of devices for mobile communication and 3G technologies. The advent of new technology has combined data from laptop Personal Computers (PCs), Personal Digital Assistants (PDAs) and mobile phones. During regular course of business software applications and data need to be accessible from this diverse range of platforms, which are remote from the corporate network. The accessibility requires users to store the necessary applications and data locally to do their job. Consequently, large amounts of data is being sent and received leading to the assignment of different path names by multiple recipients. It can be seen that with the proliferation of networked tools (e.g., PDA devices like a Palm Pilot™ product), the storage needs for many system operators is escalating at an alarming rate.

At the same time, the data being transmitted can lead to widespread access to very sensitive confidential information. A lost PC or PDA can allow the finder to access some of a company's most important confidential information. Stated alternately, the proliferation of network tools is making it very difficult for a the owner of confidential business information that is accessible on a network to maintain limited distribution and to otherwise effect logical management of sensitive data.

Efficient disk optimization is also difficult to achieve because companies have minimal control over where the data and files are stored. For example, an employee storing a personal collection of mp3 tracks on disk1/music forces a company to incur costs that are unplanned. Accordingly, the true cost of centralized storage, and storage on portable devices, can increase from cents per gigabyte to dollars per gigabyte. In this manner, storage for organizations can quickly become expensive, unmanaged and invisible.

In U.S. Pat. No. 6,615,405, an example of a system for installing software on microprocessor based devices is provided for accessibility over a computer network. The system includes identifying component data associated with a software application using an electronic device. The system generates a first server update algorithm by comparing the component data against data present on a first server and executing the first server algorithm thereby duplicating the component data on the first server. Then the system generates a second server update algorithm by comparing the component data on the first server against data present on a second server and executing the second server algorithm thereby duplicating the component data on the second server. Finally, the system generates a second device update algorithm by comparing the component data on the second server to data present on a second device and installing the software application on the second device by executing the second device update algorithm.

The current systems continue to follow the Boolean logic by assigning a new path name to each file or sub file so that it can be accessed and retrieved. Such systems do not provide search functionality or easily permit application of policies to regulate or manage the files or data. In other words, there is no known system to eliminate multiple path names or files for the same or equivalent document being stored by different and in some cases even the same user. For example, Client A sends a message to Client B. Client B replies by sending a message which attaches the original message sent by Client A. Thus Client A now has the message from Client B plus the original message from his/her/itself which is now assigned a new path name. The rapid increase in storage requirements can thus be better understood particularly with the increasing and widespread use of electronic communications and electronic documents. Faxes once produced by paper are now being electronically delivered to users on their PC's.

In short, many businesses are now confronting an explosion of electronic data storage which is expensive to acquire, expensive to maintain and which takes up space. In addition, the site costs go up due to the need for cooling and electrical power.

The complexity of the problem is because file names are not standard, The user selects some component of the path name. The only information that can automatically be determined about a file is from the filename extension and administrative properties. For instance, when an employee creates a PowerPoint presentation "salesforecast.ppt" on a Windows box with a default registry, information available to the employee includes the Power Point file format, the size of the file, the file creation date, and the last date accessed and modified. If additional information is desired pertaining to the file contents, the person accessing the file must rely on information the author may have provided in a file summary depending on whether the author took the time to create it. If the file summary or an informative filename has not been provided, the person accessing the files may spend a significant amount of time manually searching through a series of files and directories.

In view of the above and other related drawbacks and limitations identified in the relevant data management systems, there is a need for a meta-data driven intelligent file system that uses profiles and policies to create file manipulation that no longer relies simply on a path name.

BRIEF SUMMARY OF THE INVENTION

In various exemplary embodiments of the present invention, meta-data is monitored for each document. Policies and protocols are applied to limit multiple storage of the same documents. That is, a file system is managed using profiles and policies to create file manipulation that no longer relies simply on a path name. A user can manage files where the data lives and have greater control over configuration and customization of the administration and structure of the data.

More specifically, the current invention provides a layer between a file system and a user's storage that provides an open architecture to integrate storage management, content delivery, business intelligence and any other system that manages and creates large amounts of data. In general, the layer includes executable logic that modifies a file system structure based upon meta-data. An executable logic, or policy, executes using meta-data to store relevant files in a specified location. Additional policies could be extended that prevent deletion of data, duplication of data, enforce structure to data or apply any other relevant business objectives.

In accordance with one aspect of the present invention, a system for managing data is provided. The system comprises a network for interconnecting a plurality of computers. A data storage means is connected to the network to receive, store and transmit a plurality of files to and from said network. Each file has a unique identifier associated therewith. A plurality of computers is connected to the network. Each of the computers are configured for originating and for receiving files. A first computer is operable to send a first file to the data storage means for storage. One of the data storage means and the first computer is operable to generate and send the unique identifier associated with the first file to at least the first computer and a second computer. The first computer and the second computer are each operable to retrieve the file from the data storage means using the unique identifier.

In accordance with another aspect of the present invention, a system for managing data is provided. The system includes at least one storage asset arranged to store data. A stand alone computer system is connectable to the storage asset. An abstraction layer is provided between the stand alone computer system and the storage asset. The abstraction layer provides storage area to store file information. In addition, the abstraction layer has an open architecture to provide capability to associate policies to the data. The abstraction layer includes executable logic to modify the data based on the file information.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It should be appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made in detail to the preferred embodiments of the present invention, examples of which are illustrated in the accompanying drawings. The various exemplary embodiments provide a meta driven intelligent file system that uses profiles and policies to manipulate files by primary reference to a files meta-data.

Figure 1:
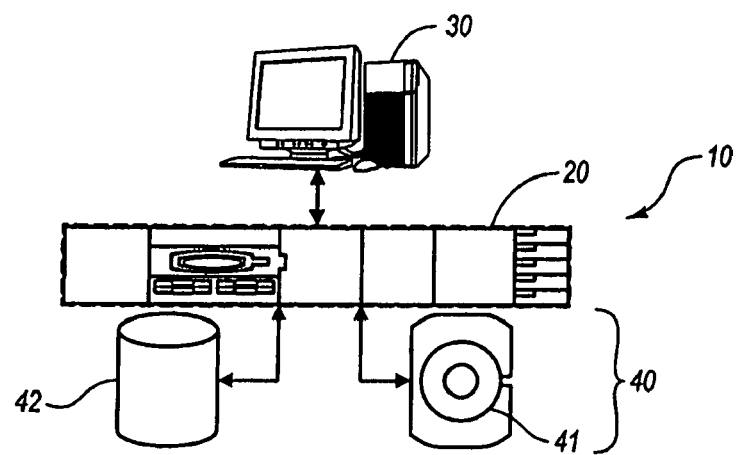
FIG. 1 is a schematic diagram of an embodiment of a system for data management in accordance with the present invention.

An intelligent file system 10 is depicted in FIG. 1. The system 10 has an abstraction layer 20 interconnected between the file generating system or file system 30 and the user's storage 40. As shown in FIG. 1, the file generating system or file system 30 is any system capable of generating a storable file such as personal computer (e.g., tower, laptop or notebook), a mobile computer system such as a PDA or any other device or tool capable of generating a storable file with a path name. The file generating system may here be discussed largely in the context of a Mircrosoft® or WINDOWS® system. However other operating systems or formats, including MacIntosh™ and Linux™, may be used. The storage asset 40 includes any suitable storage including a network attached storage (NAS) 42 and/or a local CD, hard drive or other device which is here referred to for convenience as a disc 41. Desired protocols and policies are applied by the abstraction layer 20 to manage the storage of the data or files generated by the file system 30.

The abstraction layer 20 provides, receives and stores file summary information so that the identity of files can be recorded and retained for further use. Thus users including industry vendors, system integrators, and the like have a tool that allows one to integrate storage management, content delivery, business intelligence and any other system information to assist in managing large amounts of data.

The intelligent filing system uses profiles, meta-data and policies to create file manipulation, which does not solely rely on the pathname. The concept uses executable logic to modify the file system structure based on meta-data. This system provides the additional flexibility of defining a policy, such as stating where the data is to be stored and the like. For example, a particular system may present the user with the option of storing on the NAS server or departmental server. Yet other options may prohibit storage or limit storage to the local disc of the PC that generated the file. Assuming the policy allows for storage, then the policy in the abstraction layer 20 executes using the meta-data and in turn directs the data to the specified storage location such as the NAS device 42 or a disc 41. Meta-data may be structural, content derived or user information derived externally. Structural meta-data represents generic file meta-data, such as, the name of the file, the directory location of the file, the time the file was created and who created the file. Content meta-data is derived meta-data, which can be meta-data extracted from the content of a file. Policies can be extended to prevent deletion of data, duplication of data, enforce structure to data, prohibit storage or apply any other relevant business objectives.

The abstraction layer 20 constructs the users view of their file and data (e.g. a virtual file system) and supports access to the users view across a range of standard protocols. This preserves the users access methodology and significantly eases the use of the system for the user. Whenever the user changes or creates data, the abstraction layer 20 would, as a matter of policy, extract and update file meta-data and determine whether new physical copies of that data should be copied. As multiple users share the same abstraction layer 20, the system automatically avoids creating unnecessary file duplicates leading to substantial savings in storage space required.

Meta-data is well known and is data that is descriptive or reflective of the actual content of a document. Meta-data can include the names of the document, its size, the type of data contained, length, fields, columns, and also how the information is associated. Meta-data describes a file in a more meaningful way over a path name because the meta-data not only can provide information about content, but it can also include interest group flags, retention periods, delete dates, and other file and management policies which are to be applied to record management. Thus for example, a policy could be applied that would not allow a user or selected users to store music or music video because the abstraction layer 20 would recognize the meta tags of a song or music video. That is, a user would have a profile that would be recognized by the abstraction layer that would control the options or actions to be applied to the file storage requests of that user. For example, a class of users that tended to retain music music-videos could be precluded from saving them. In turn the savings in data storage space could thereby be very significant in an organization with a lot of users tied to a common network.

To illustrate or explain in the context of a simple theoretical example, a user can create a file that is to be called or named best_wine.doc in the normal file management structure. The file is then assigned or creates metadata tags upon saving it into a directory in the abstraction layer. The lay out of the users file space can be quite arbitrary but here is selected to reflect origin and content. The file in this example would be assigned a path such as WORK/REVIEW/WINE. The abstraction layer 20 then has a policy that directs storage of work documents in a desired directory or wine documents in a specific directory. A protocol in the abstraction layer selects one as the dominant and directs the file to the correct storage location like an NAS server.

The abstraction layer 20 is also able to give visibility of a document or file to other users on the basis of its meta-data tags without consuming additional physical storage. The protocol in the abstraction layer may direct the document to certain recipients when certain key terms or meta tags appear so that the document is placed (by meta-tag) in the directories of selected other users.

Thus the abstraction layer 20 reviews the document or file and after naming it assigns it a meta-tag data tree originating with "Home" as its starting position. A branch entitled "Work" can stem from "Home" and two branches "Review" and "Published" can stem from "Work." Furthermore, two branches "Wine" and "Food" can stem from "Review." All of these options are available to the user who is coding the documents.

Taking this example of a meta-data tree, a file can be placed in any set or sub-set of the tree. For instance, a file "best_wine.doc" can be placed in the Home_Work_Review-_Wine directory by setting meta-data tags "Review" and "Wine" to true and meta-data tags "Published" and "Food" to false.

A second policy associated with the directory can now be set to copy the file to another user's directory. In this case, the second policy dictates that when the meta-data tags for "Review" and "Wine" are set to true, a copy of the file, "best_wine.doc", is placed in the user's respective directory, i.e., Home_Work.

Logic in the abstraction layer 20 is used to augment information and decide where to store the file as opposed to the filename. Accordingly, more flexibility and control is provided over where data is stored and how data is duplicated.

The abstraction layer 20 allows for the effectuation of more intelligent searches based on or using the meta-data or tags. The system 10 provides an active profile to allow for intelligent searching based upon the meta-data tags. Instead of manually searching and retrieving data through directories and files, the system 10 automatically searches through a file system for the specific data.

Continuing with a theoretical example, a client program allows an interface with the abstraction layer 20 and creates a new policy for a search criterion. For example, if a user is interested in searching for all data referencing wine, a new policy is created for a folder Search_Results_Wine, with "wine" listed as an interest, criteria or keyword. The folder, Search_Results_Wine is then auto populated with all files that have meta-data tags relating to wine that are set to true.

The system 10 also automatically synchronizes the data in the storage assets 40. With respect to a mobile user, a profile can be setup to do automatic synchronization of data. For example, when files are created locally, a cache of the meta-data and profile databases can exist. As files are created, meta-data is cached, so when reconnection with the abstraction layer 20 is made, the files can be re-synched and the meta-data database updated automatically. So as a user logs in and out, important data on the disk can be automatically transferred via the abstraction layer to the appropriate permanent storage locations.

A "shutdown" profile can also be created to automatically cache files with certain profiles back to laptops or mobile devices. This way a user can always have the files in the "shutdown" profile even when working offsite. Also, the user should never be concerned about whether a file is available on the portable devices or whether an extra copy of the file has been saved on the portable device before removing it offsite. File duplication on the portable devices and network create wasted space and confusion when a later revision is made.

The system 10 manages data automatically. Policies can be placed in the abstraction layer 20 which can be applied to track the data, monitor the usage of data, and add structure to data, as it is stored. Expensive overhead for companies or users is reduced by eliminating old, unreferenced and no longer needed data by identifying documents stored by reviewing their history and noting that after storage they have never been accessed. Some documents are archival and should not be deleted without an affirmative decision to that effect. Other documents can be coded so that automatic deletion occurs based on non use over a period of months or years based on the document content. Thus an the abstraction layer 20 operates, if desired, to purge or eliminate stored documents that are of no value based on a pre-selected profile. The user thus is able to eliminate unused documents which occupy and can be said to fill their valuable and limited storage assets.

In the overall storage market, it is presently understood that data center storage is expected to increase between 40-60% annually though 2006. The present invention reduces unnecessary data storage and in turn the proliferation of electronic storage hardware and software at substantial expense. For example, the abstraction layer could be configured to allow for a "lifespan" delimiter to be associated with specific data. For example, a meta-data or meta tag could be applied to a directory that means "keep file for a month before advising whether it should be deleted."

Some instances exist where users should be prevented from deleting data, or accessing sensitive data such as, transaction records in a trading environment. A policy of regulatory control could be designed to prevent files being deleted, by associating a "do not allow the file to be deleted" meta-data tag to a directory. As a file is saved to the directory, the meta-data tag is set to true.

The abstraction layer 20 of the system 10 can attach a value to data as it is being stored. That is, protocols can be devised to produce a cost number associated with the cost of purchasing and maintaining a system of FIG. 1. Cost numbers can be then developed which can then be matched against the cost of electronic (e.g., server) storage. Companies or users are then able to determine the cost storage ratio, and also gauge how secure and how often the storage location should be backed-up.

Regulatory control particularly in finance, healthcare and government entities generally require stringent file keeping standards. Publicly traded companies in the U.S. are typically required to commit to integrity of financial data with significant personal and corporate fines if the companies fail to comply. The abstraction layer of the present invention allows the user to put into place protocols so that files generated electronically can be monitored to ensure that all generated documents meet certain strict criteria and impose current data access tools including several data management layers to meet regulatory criteria. Thus documents dealing with a product failures or drug side effects can be collected and preserved so that prompt recall action can be taken under applicable Consumer Product Safety Commission rules. Controls for confidential and other propriety information can be imposed with the system even able to recognize the terminal code for each user accessing selected data.

Figure 2:
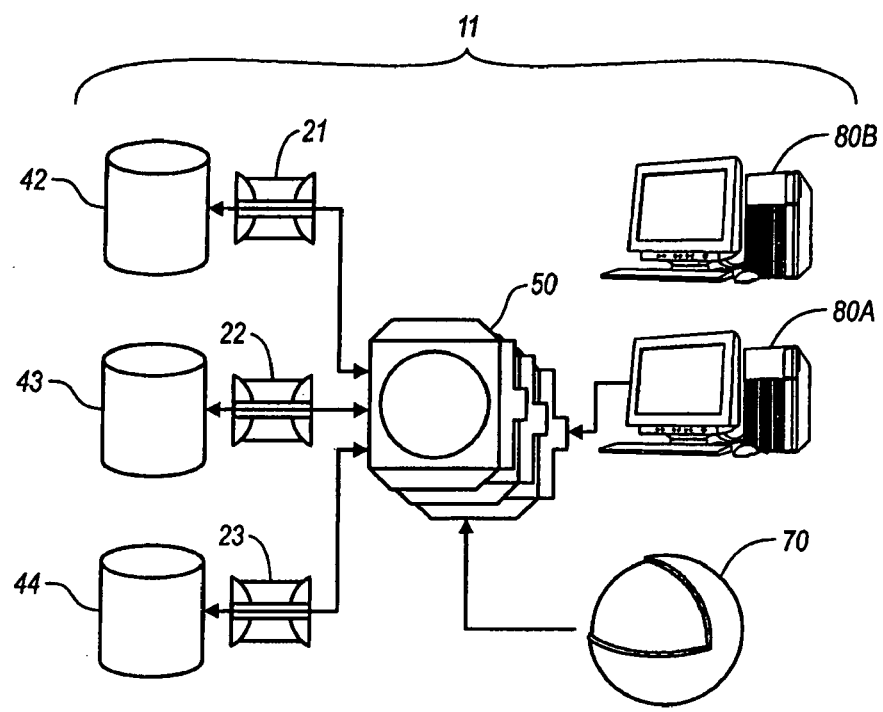
FIG. 2 is a schematic diagram depicting graphically the architecture of an embodiment of a system for data management in accordance with the present invention.

In a preferred arrangement, the system architecture 11 shown in FIG. 2 is configured to operate in a system that is networked, such as a network of interconnected computers. It includes a resource engine (RESD) 50 connected to storage devices like NAS device 42 and other suitable storage devices 43 and 44. It also includes an abstraction layer 20, represented in FIG. 2 as storage mediation layers 21, 22 and 23, and a shell 70. Users or clients 80A and 80B reflect multiple users of the networked system.

The shell 70 is an external administrative tool to allow access to the resource engine 50. Authorized users of the shell 70 may access the engine 50 to activate or deactivate features or functions (such as policies), add functions to the engine and to the abstraction layers 21, 22, 23 and otherwise to monitor and administer the system 11.

Figure 3A:
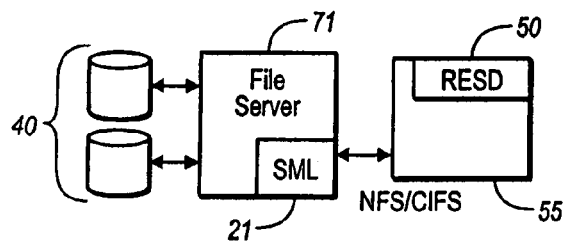
FIG. 3A is a schematic diagram of components in the system architecture having a traditional file server in accordance with the present invention.
Figure 3B:
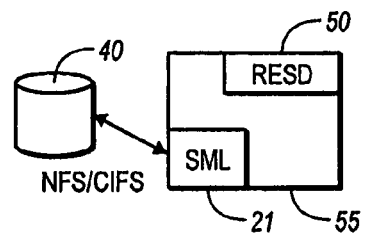
FIG. 3B is a schematic diagram of components of the system architecture having a network attached storage server in accordance with the present invention.

The arrangement of FIG. 2 is configured for use, as shown in FIGS. 3A-3B, on one or multiple servers within a user's environment. If the storage asset 40 is controlled by a traditional file server (POFS) 71, the storage mediation layer (SML) or abstraction layer 21 is found programmed into the file server 71, which communicates via a proprietary protocol with the resource engine 50, as illustrated in FIG. 3A. In the embodiment of FIG. 3A, resource engine 50 is a server process that is resident on server 55 and services requests for resources such as file shares, data, meta-data profiles and policies. Although illustrated as such, resource engine 50 is not required to be located on server 55, it may be resident on any processing device with sufficient processing power to provide the necessary operations of the resource engine 50.

Alternatively, if the storage asset is a Network Attached Storage, such as the NAS 42 of FIG. 1, then the storage mediation layer (SML) or abstraction layer 21 is programmed or positioned within server 55 as illustrated in FIG. 3B, and may particularly be programmed or positioned within the resource engine 50. In general, it is possible to locate the SML Agents on any computer in the users network which has sufficient network bandwidth available to communicate with the resource engine 50.

There is one abstraction layer or storage mediation layer 21, 22, 23 per each storage device 42, 43, 44 of the storage asset 40. Each abstraction layer 20 converts the local file system abstraction into a universal file system abstraction. For example, the abstraction layer 20 is able to convert from a Unix pathname /dir1/dir2/text.doc or a Windows® pathname \dir1\dir2\text.doc to an abstraction identifier or file name because it takes an abstraction of the filename from the Unix or Windows systems and converts it into its own identifier. As the storage mediation layer 21 understands the native format it maintains a map between the internal representation of the file and the native representation on the storage device 41, 42, 43.

In one embodiment of the present invention, two SMLs are provided, one for the NAS 42 and one for the POFS 45. An SML for each type of backed storage allows each abstraction layer to be configured to hide the details of interfacing to each type of storage from the resource engine 50. The resource engine 50 instead talks to an abstracted remote file interface so that in effect, it becomes compatible with each form of data storage resource. At present the abstraction layer 20A for the network attached storage (NAS) allows for use with all storage devices accessible using the Network File System (NFS) protocol, and the POFS abstraction layer 20B addresses locally mounted file systems through the UNIX standard file access API as defined in the Portable Operating System Interface (POSIX) standard in use with direct attached storage (DAS) and storage area networks (SAN) type media.

Figure 4:
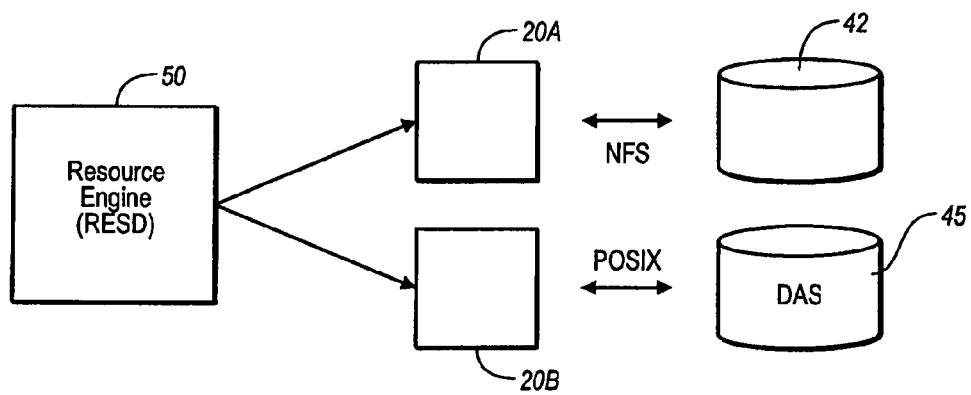
FIG. 4 is a schematic diagram of the flow between the resource engine and the storage assets of a system of the present invention.

FIG. 4 shows a resource engine 50 communicating through a SML or abstraction layer 20A in communication with the Network Attached Storage device 42, with a network file system (NFS) through an abstraction layer 20A. At the same time, or alternately, the resource engine 50 may communicate through the abstraction layer 20B, configured to interface through POSIX, with detached storage (DAS) 45. The RESD 50 may assign, using pre-configured policies, a tag internally referred to as the StoreId which will dictate which abstraction layer 20A, 20B will store the physical content of the file. The system permits a file to have multiple StoreIds.

Figure 5:
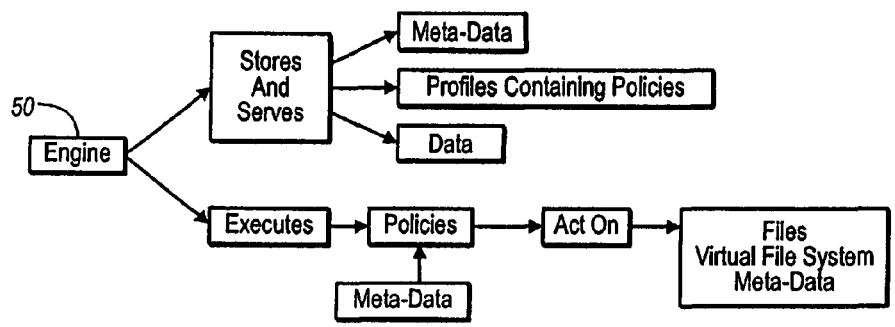
FIG. 5 is a schematic diagram of the flow between the resource engine and system resources in accordance with the present invention.

With respect to the flow diagram of FIG. 5, the resource engine 50 is a server process that services requests for system resources. The system resources include data, meta-data, i.e. information about files, users and storage assets, and administrative functionality such as profiles and policies. As shown, the functionality of the resource engine 50 is to store and serve data, meta-data and profiles containing policies. The resource engine 50 also executes policies triggered by activity on the file or timers, contained in the logic engine, the Virtual File System (NjVFS) and meta-data discussed hereinafter.

The peer-to-peer architecture, from which the system architecture is based, allows for the collaboration of a set of servers, which enables a user to access resources from a particular pool without needing to be "hardwired" to any particular or specific machine or network. A "pool" delimits the resources. The pool defines a collection of resources that are available to all members of a specific pool, i.e. a user joining the pool can only access all file spaces and profile administration.

Figure 6:
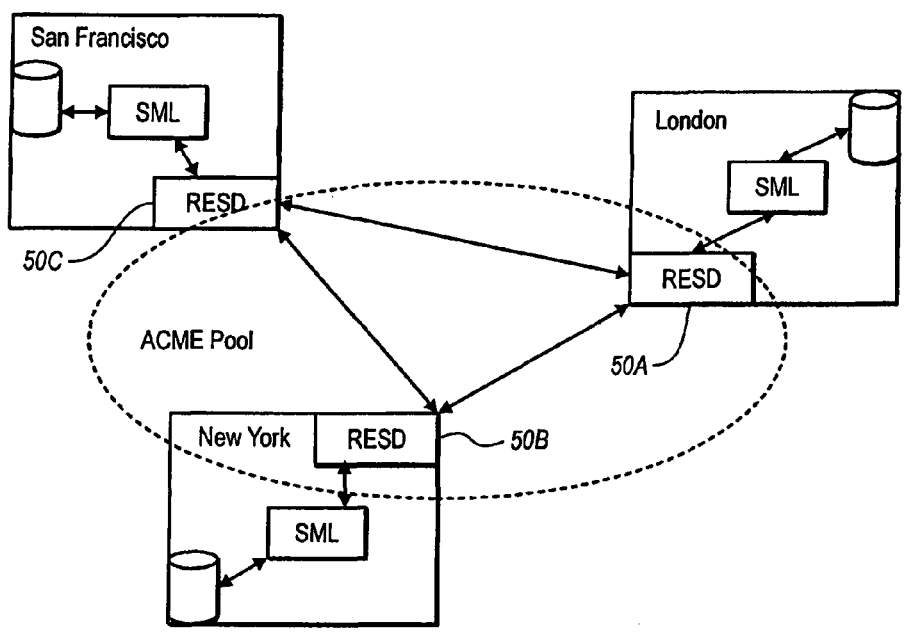
FIG. 6 is a schematic diagram of the multiple resource engines connected together in accordance with the present invention.
Figure 7:
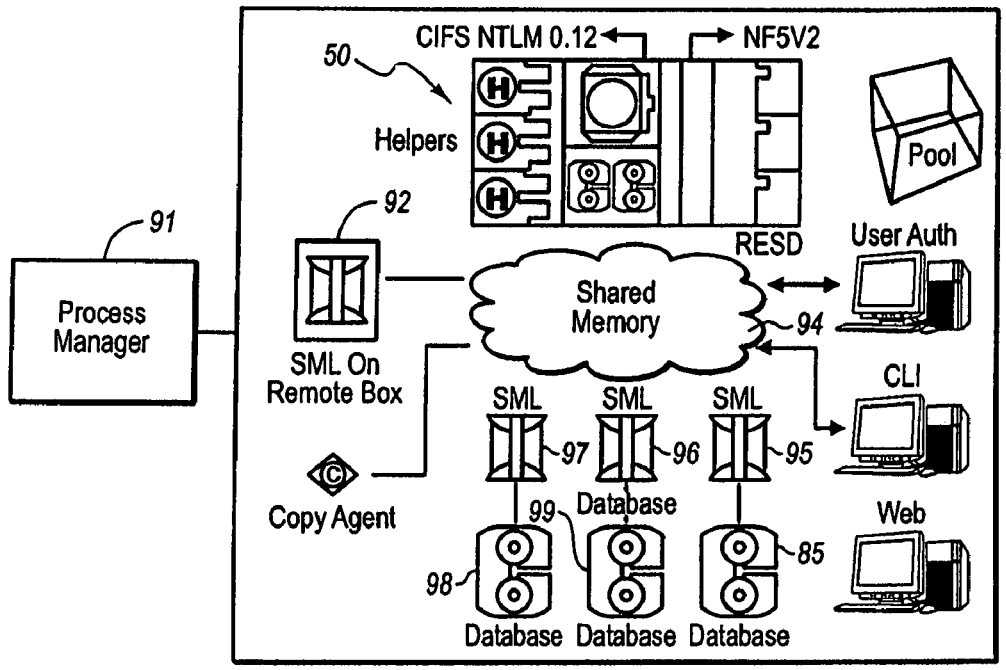
FIG. 7 is a schematic diagram of the network components that compromise the resource engine, memory and the protocol adapters in accordance with the present invention.
Figure 8:
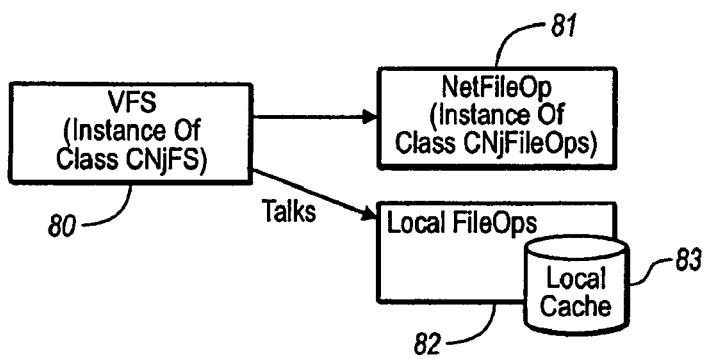
FIG. 8 is a flow diagram of a NjVFS (Virtual File System) connected to two types of physical storage via a file operations manager in accordance with the present invention.

FIG. 6 is a depiction showing how multiple resource engines 50A, 50B and 50C can exist to service requests for a company's resources. Each branch of the company runs one of the resource engines 50A, 50B, 50C. In this regard, a project's team members in London can access a file space for an ongoing project in New York. In the example illustrated in FIG. 6, the ACME pool or control protocol is built into the abstraction layer. accordingly, each branch of the company (i.e. San Francisco, London and New York) runs an engine 50A, 50B, 50C. The ACME pool allows an administrator access to all the company file spaces and profile administration data throughout the company. The network directs from where the data is retrieved.

The protocol adaptors translate protocol requests into internal requests inside the system universe. Protocols exchange information about file spaces between file servers and other computers. For example, File Transfer Protocol (FTP), Network File System (NFS), Common Internet File System (CIFS) and TELNET are four protocols that may be supported on the resource daemon. An application runtime environment is associated with each of the protocol adaptors. In a preferred embodiment, the present invention supports the use of NFS Version 2 and CIFS NTLM 0.12, however, other versions and variations may be used without departing from the intended scope and operation of the invention.

Located in the resource engine 50, the gateway to the users data is through the Virtual File System (NjVFS). The NjVFS is a logical representation of a users file space, which can be altered by the RESD 50 without moving, deleting or otherwise changing the physical stored data. Core level meta-data is used to construct the NjVFS—structural and content meta-data that is found in a shared database repository. In one embodiment, the NjVFS is a cached memory representation of the structure of a user's file space in volatile memory. As such, the NjVFS is a transient representation of a file system structure. At a lower level, a NjVFS interfaces directly with the Policy Engine. Every NjVFS talks directly to a file operations manager, which decides where the physical image of a files data resides.

The resource engine 50 stores all of its configuration within a shared database. When a user connects to RESD 50, the system associates the user to his/her file space.

A client 80A and 80B can communicate with the resource engine 50 to access files, administer changes to user profiles, and create, modify, and delete policies. In addition, the client 80A or 80B, via the resource engine 50 can browse and modify system meta-data, or perform advanced searches using file meta-data. Alternatively, regardless of how the system is accessed, the accessing entity becomes a client through standard protocols CIFS and NFS.

The shell 70 allows an administrator to initiate command line modification of system parameters and system administration. A user can administer the system 10 through a graphical front end available in standard web browsers.

Figure 9:
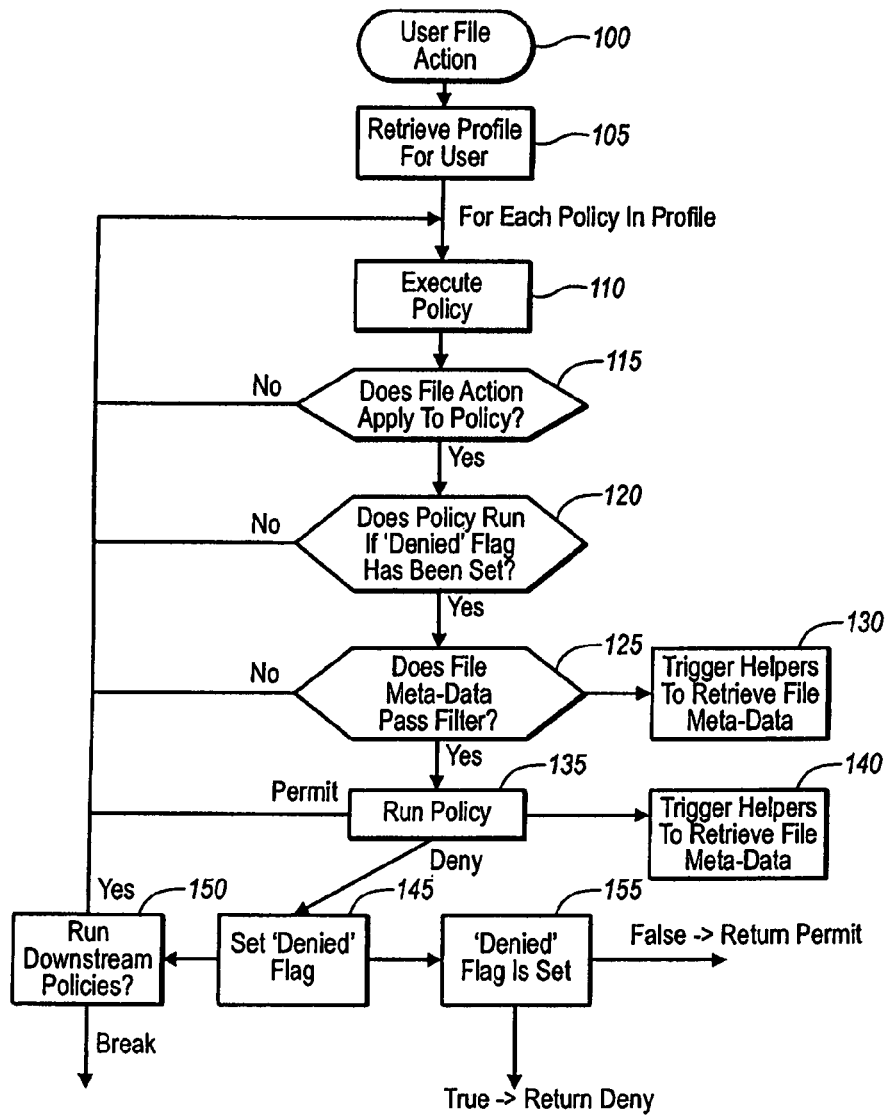
FIG. 9 is a flow diagram of a policy engine in accordance with the present invention.

A flow chart of a policy engine is illustrated in FIG. 9. The policy engine references and affects both the structure of a NjVFS and the data path, in terms of where the file contents are actually stored when passed to NetFileOp. Each user has a profile, which contains policies that trigger on file actions such as file modify or delete etc. For example, a user can have policies named "login," "file create" and "file delete." During the execution of the policy relevant to the users profile and the file action concerned, if the policy requires meta-data previously defined as retrieved from a given Helper, the system 10 can trigger the Helper to retrieve that meta-data. Helpers are written to a standard interface and are runtime changeable.

If the system 10 triggers a Helper as described herein, it generates helper meta-data then adds the helper meta-data to generate standard meta-data. Helpers are created to derive from a file, file format specific meta-data from the files contents. Even without a file format specific Helper the system has available standard file attributes, which encompass standard NTFS and POSIX attributes. The system 10 then executes any additional logic defined in the policy, which can result in the file action being permitted or denied. In the event that the file action is denied an additional logical flag in the policy allows the system 10 to abort or ignore the execution of the additional defined polices for the same file action.

Figure 10:
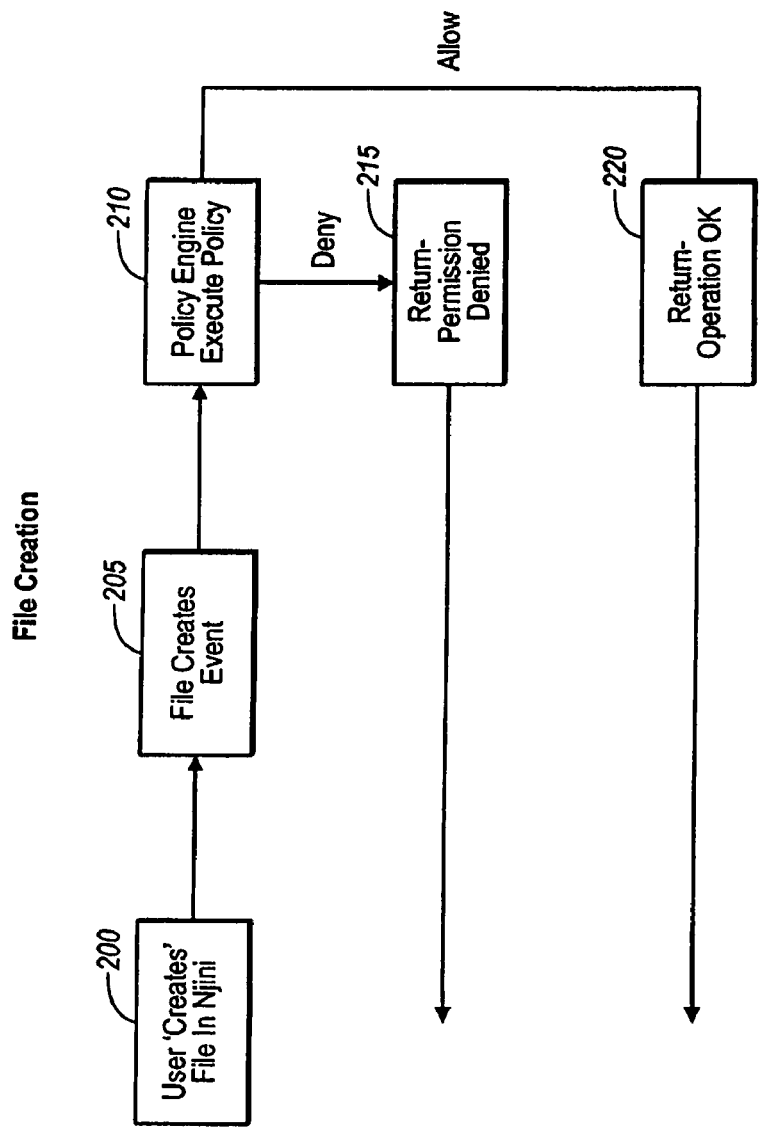
FIG. 10 is a flow diagram of file creation in accordance with the present invention.
Figure 11:
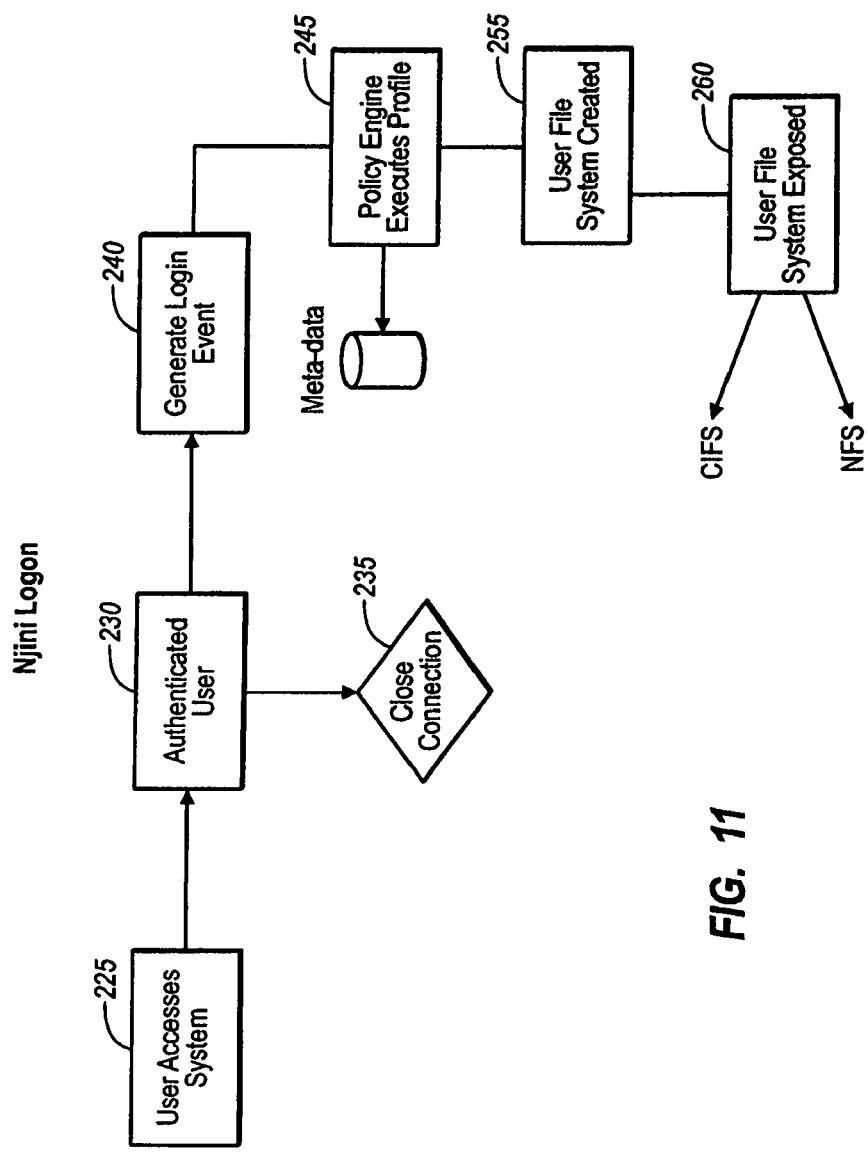
FIG. 11 is a flow diagram of a system login in accordance with the present invention.

File creation and login policies are illustrated in FIGS. 10 and 11. During file creation, the user creates a file, then the CNjFs file creates an event. Next, the policy engine executes the policy, which either allows or denies the data. If the data is denied, the permission denied is returned. If the data is allowed, the operation permission is returned.

When a user logs in, the system creates a "users" file space. From the users profile, a series of login policies can be called. The login polices contain logic that determine the structure of the user's file space. For instance, the login polices can create the users directories and populate them with files. As shown in FIG. 11, the user accesses the server and the user is authenticated. If the user is not authenticated, the session is closed. If the user is authenticated, a login event is generated. Next, the policy engine executes any relevant policies contained in the users profile. A user file system is then created and exposed to direct the system to the NFS or the CIFS.

For every file in the NjVFS, a core set of meta-data, fields and information exists, e.g., file name, who the file belongs to, where the file was created and when the file was last modified. A store identifier ensures a file is sent to one SML against another. For example, a policy can be set to recognize "*.doc." By setting the store identifier to 2, as opposed to the default 1, it is possible to differentiate the storage used to support the data for that type of file.

Figure 12:
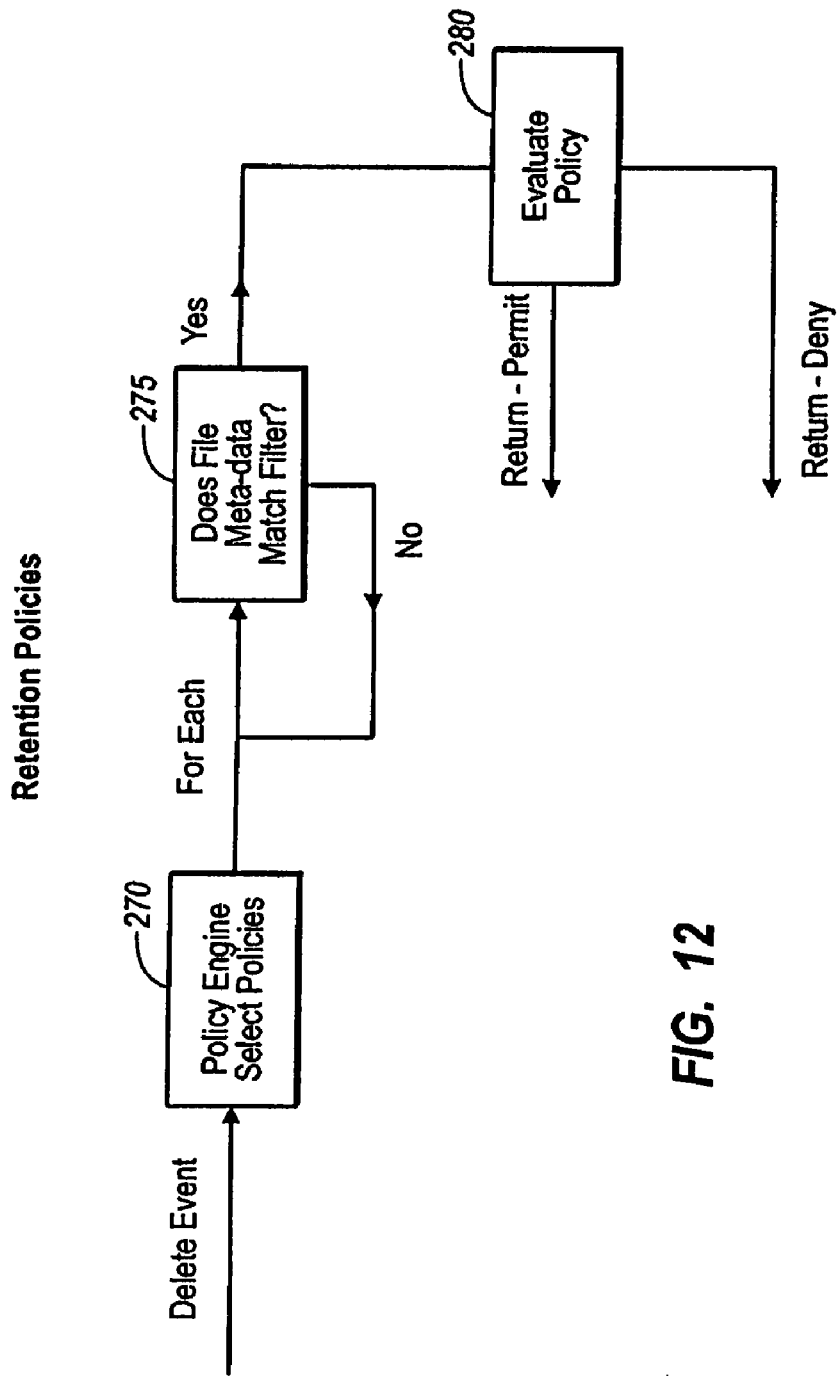
FIG. 12 is a flow diagram of retention policies in accordance with the present invention.

FIG. 12 shows how the system implements retention policies. When a delete event is initiated, the policy engine selects the policies. Next, the system checks to verify whether the file meta-data matches the filter for each of the data. If it matches, the policy is evaluated and the system returns a permit or deny command.

A Secure Hash Algorithm (SHA)1 hash key is a unique 160-bit number for a file. When a file transits a NjVFS, the SHA1 helper calculates the SHA1 hash key for the file. For policies such as "file modify," when an attempt is made to create a file, the SHA1 helper will calculate the SHA1 hash key and then search to determine if another file exists with an identical key. If another file exists with the same SHA1 hash key, instead of creating a separate copy of data, a ghost file is created in the NjVFS. The system is able to combine small atomic modifications to the file into larger modifications for the purposes of checksum calculation. In this way, file system performance is not adversely degraded. Data is thus de-duplicated.

Figure 13:
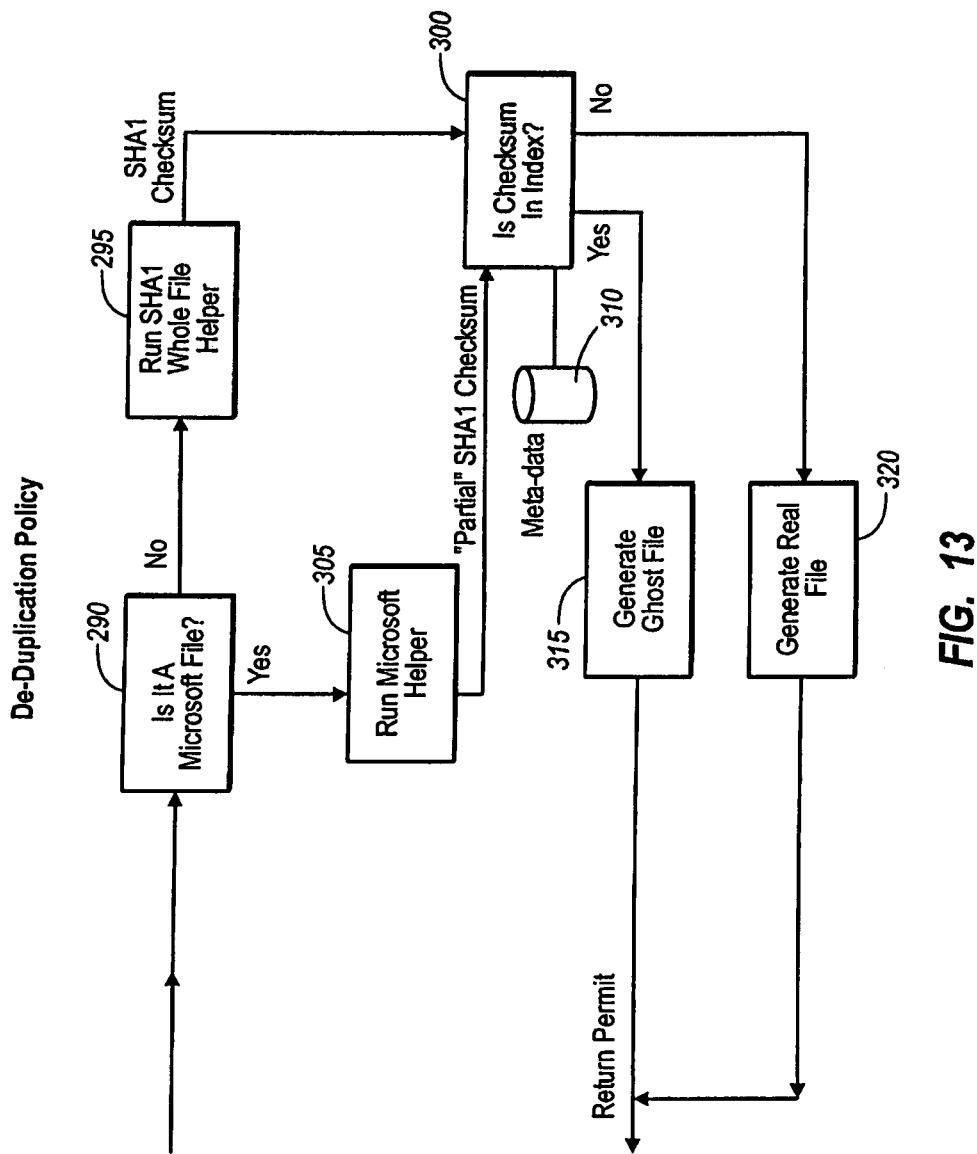
FIG. 13 is a flow diagram of a de-duplication policy in accordance with the present invention.

The de-duplication policy is further outlined in FIG. 13. In the de-duplication process, the user creates an event and the system verifies whether the file is a Microsoft OLE file. If the file is a Microsoft file, the system runs Microsoft Helper and a partial SHA1 Checksum is executed. If the file is not a Microsoft file, SHA1 Whole File Helper runs and SHA1 Checksum is executed. Next, the system checks whether the Checksum is indexed with the meta-data. If it is, a ghost file is generated. If not, the system generates a real file. Then, system returns a permit command.

Figure 14:
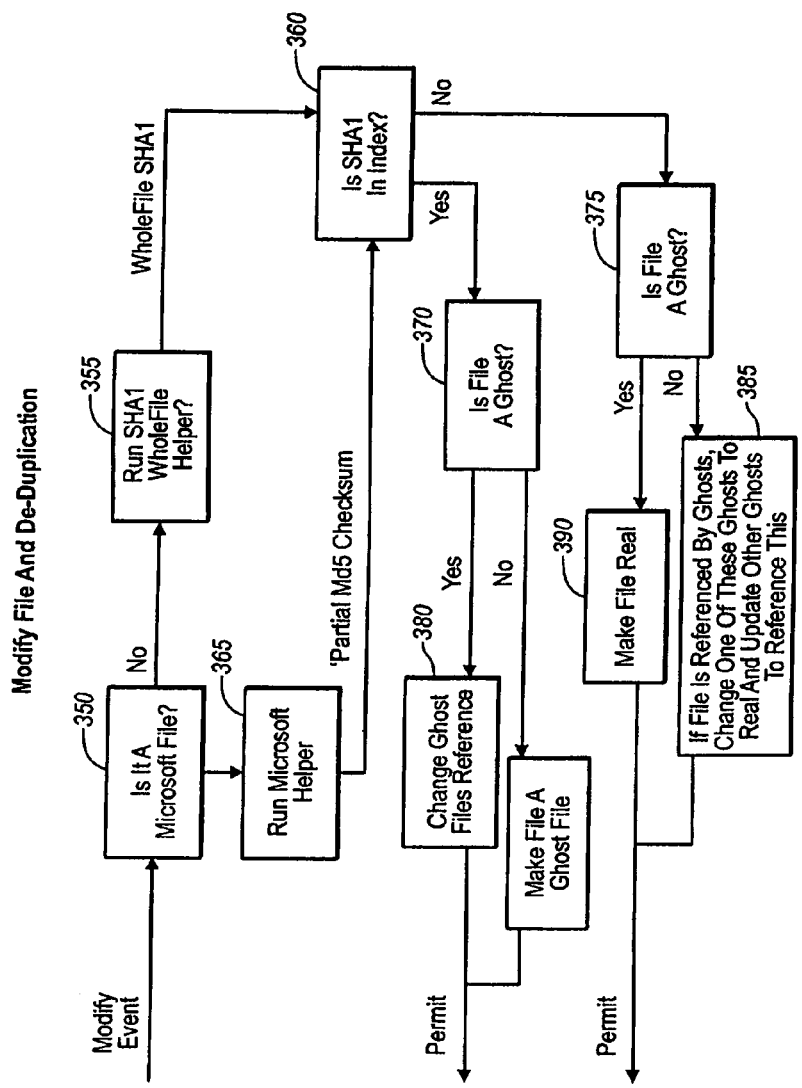
FIG. 14 is a flow diagram of a system process for file modification and de-duplication in accordance with the present invention.

As illustrated in FIG. 14, the system can modify and de-duplicate files. First, the user sets up a modify event. The system checks whether the file is a Microsoft file as discussed above with respect to FIG. 13. After the system checks whether the checksum is indexed, it verifies whether the file is a ghost file. If the file is indexed and is a ghost file, the system is directed to the NOP. If the file is indexed but not a ghost file, the system makes it a ghost file. The indexed file is then returned with a permit command. If the file is not indexed but is a ghost file, the system makes it a real file. If the file is not indexed and not a ghost file, the system is directed to the NOP. The file is then returned with a permit command.

The stored data can be accessed without having to use the system. However, the format of stored files on the NjVFS is in a semi-human readable form. Accordingly, a utility has been created to convert the data from a NjVFS format to what a user readable form.

In large, complex corporate environments, the present invention enables more control to be asserted over the management of file systems and data. It brings ease of use, improved resilience, better administration functionality, integrated security benefits, true scalability of data and enabled collaboration between departments, projects and users.

The present invention resolves much of the complexity and problems inherent with data management. The fact that the user can be presented with an environment similar to what they are familiar reduces complexity in both ease-of-use as well as administration.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of managing data, the method comprising:
receiving a first data storage request for a first file associated with a first file system path;
determining a unique identifier for the first file based on at least a portion of content of the first file;
determining if the content of the first file has been previously stored based on the unique identifier; and
in response to the determination that the content of the first file has not been previously stored:
storing the content of the first file in a first storage location;
generating first metadata representing the first file system path;
associating the first metadata with the content in the first storage location;
executing, by an abstraction layer that is common to all users, a policy to determine additional metadata for the first file based on the content of the first file, or the first metadata, or both the content of the first file and the first metadata, wherein the first file is associated with a user, and wherein the policy is executed at least when the content of the first file is changed by the user;
associating the additional metadata with the content in the first storage location;
generating a first virtual file system path based on the first metadata and the additional metadata, wherein the first virtual file system path specifies a first virtual storage location in a virtual file system for accessing the content of the first file,
providing the virtual file system including the first virtual file system path, such that the content of the first file stored in the first storage location can be accessed through the first virtual storage location in the virtual file system using the first virtual file system path.

2. The method of claim 1, the method further comprising:
receiving a second data storage request for a second file associated with a second file system path different from the first file system path;
determining a unique identifier for the second file based on at least a portion of content of the second file;
comparing the unique identifier for the first file with the unique identifier of the second file to determine if the content of the second file is the same as the content of the first file; and
in response to the determination that the content of the second file is the same as the content of the first file:
generating second metadata representing the second file system path; and
associating the second metadata with the content in the first storage location.

3. The method of claim 2, the method further comprising:
receiving a data retrieval request associated with a requested file system path;
generating third metadata representing the requested file system path;
comparing the third metadata with the first and second metadata; and
providing at least a portion of the content stored in the first storage location in response to the third metadata matching the first metadata or the second metadata.

4. The method of claim 2, wherein the first data storage request and the second data storage request are received from a first user.

5. The method of claim 2, wherein the first data storage request is received from a first user and the second data storage request is received from a second user.

6. The method of claim 2, wherein the first data storage request is received via a first protocol and the second data storage request is received via a second protocol.

7. The method of claim 1, wherein the first storage location is independent of the first file system path.

8. The method of claim 1, wherein the additional metadata includes an interest group.

9. The method of claim 1, wherein the additional metadata includes a retention period.

10. The method of claim 1, wherein the additional metadata includes a delete date.

11. The method of claim 1, wherein the additional metadata includes structural metadata.

12. The method of claim 1, wherein the additional metadata includes content metadata.

13. The method of claim 1, wherein the virtual file system is accessed using a file system protocol.

14. The method of claim 1, wherein the policy is executed in response to a login of a first user.

15. The method of claim 1, wherein:
the first file received via the first data storage request is associated with a first user; and
the virtual file system path is associated with a second user.

16. The method of claim 1, wherein the policy is executed in response to a user shutdown.

17. The method of claim 1, wherein the policy is executed in response to a file action associated with a user.

* * * * *